May 3, 1966

W. H. MOORHEAD 3,249,185

ONE WAY REVERSIBLE CLUTCH

Filed March 19, 1963

INVENTOR.
WALTER H. MOORHEAD

BY *Watts & Fisher*

ATTORNEY

United States Patent Office 3,249,185
Patented May 3, 1966

3,249,185
ONE WAY REVERSIBLE CLUTCH
Walter H. Moorhead, 4939 Donald Ave., Cleveland, Ohio
Filed Mar. 19, 1963, Ser. No. 266,371
4 Claims. (Cl. 192—43.1)

This invention relates to clutches and more specifically to a bidirectional overrunning clutch.

In many applications, it is desirable to have an overrunning clutch which is bi-directional. That is, a clutch in which:

(1) complete disengagement for free wheeling is obtained when power is not applied to the clutch;
(2) a positive drive is obtained when power is applied in either direction of rotation;
(3) overrunning, that is a disengagement of the power train if the driven member, due to external forces, commences to rotate faster than the driving member.

Thus, the clutch should have an ability to permit free wheeling of a driven member either when the driving member is not being driven or when the driving member is being rotated at a speed less than the speed of rotation of the driven member.

Heretofore, free wheeling clutches have been provided which obtained these advantages but only in a single direction or with very complex instructions. Where bi-directional overrunning was desired, differentials have often been utilized because no satisfactory bi-directional clutch has been available. These are unduly complex, intricate, and expensive for many applications such as lawnmowers. Thus, in many applications, it is desirable to have a bi-directional overrunning clutch and this invention provides, for the first time, such a bi-directional overrunning clutch.

The need for a bi-directional overrunning clutch is manifested in many applications. Power lawnmowers are a typical application. Power lawnmowers, especially of the type on which the operator rides on the lawnmower, are driven in both forward and reverse directions. Thus, there is a need for a drive system in either direction. The lawnmowers should be free wheeling when the power if off so that one can manually push the mower and cause it to roll along on its wheels. More important, the mowers must be free wheeling to permit the mower to negotiate a curve. Thus, for example, when the mower is turned to the left with the power on, the right wheel will commence to rotate faster than the left and, therefore, faster than the driving member.

With the present invention a simplified bi-directional overrunning clutch is provided. As an example, one such clutch may be mounted within the hub of each drive wheel on a power lawn mower. The clutch is interposed between the wheel and a drive shaft to permit the wheel to be driven in either direction but at the same time:

(1) to be free wheeling when the drive shaft is not powered; and,
(2) to overrun the drive shaft when the lawnmower negotiates a corner, goes down a hill, or has some other occurrence which causes the wheel to rotate faster than the drive shaft is rotating.

With the preferred form of this invention, a drive ring secured to the wheel has circumferentially spaced notches. A pawl is pivotally mounted within the ring and selectively moveable until it engages an appropriate one of the notches. The pawl is symmetrical about its pivot point so that it can be pivoted in either direction into notch engagement to provide forward and reverse engagement. The pawl is equipped with cam-like surfaces so that if the wheel commences to run faster than the drive shaft, the pawl is cammed out of the notch and to permit the wheel to rotate freely. A spring actuated pawl positioning member is provided which urges the pawl selectively into forward, reverse, and disengaged positions.

From the foregoing, it can be seen that the object of this invention is to provide a novel and improved bi-directional overrunning clutch.

Other objects and a fuller understanding of the invention may be had by referring to the following description and claims taken in conjunction with the accompanying drawing in which:

Figure 1:
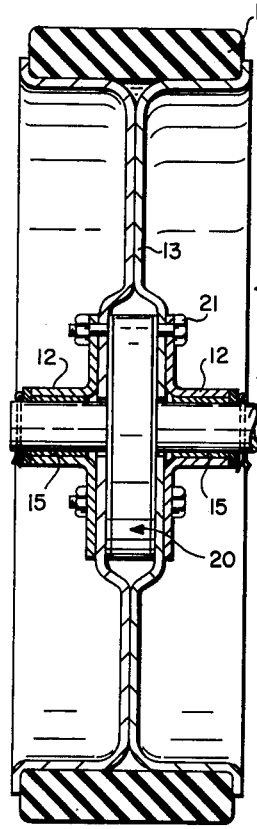
FIGURE 1 is a sectional view of a wheel equipped with the overrunning clutch of this invention.

Referring now to the drawings and FIGURE 1 in particular, a wheel is shown generally at 10. The wheel 10 is equipped with a rubber tire 11 mounted at the periphery. The wheel 10 includes a pair of oppositely oriented flanged hub members 12 which are fixed to a two-piece body 13. A drive shaft 14 is journaled within the hub members 12 by suitable bearings 15. A prime mover in the form of a motor 16 is connected to the shaft 14.

A clutch assembly shown generally at 20 surrounds the drive shaft 14 and is mounted within the body members 13 of the wheel 10. A suitable means such as bolts 21 connect the hub members 12 to the body members 13 and secure the clutch assembly 20 in appropriate position.

Figure 2:
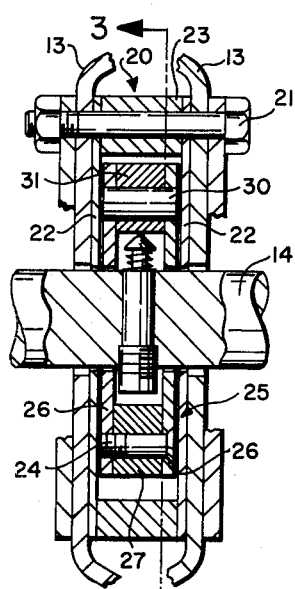
FIGURE 2 is a fragmentary sectional view on an enlarged scale with respective FIGURE 1 and in the plane of FIGURE 1, and as seen from the plane indicated by the line to of FIGURE 3, showing the internal construction of the clutch.

The clutch 20 includes a pair of axially spaced annular face plates 22, FIGURE 2. The face plates 22 are held in spaced relationship by an annular drive ring 23. The bolts 21 pass through suitable apertures in the face plates 22 and the drive ring 23 to maintain the clutch in an assembled condition disposed concentrically about the shaft 14.

A driving assembly shown generally at 25 in FIGURE 2, is mounted within the clutch housing defined by the face plates 22 and the drive ring 23. This driving assembly 25 includes a spaced pair of annular drive plates 26. A generally C shaped spacer-driver 27 is interposed between the drive plates 26. Suitable bolts 24 clamp the drive plates 26 together against opposite sides of the spacer-driver 27.

The spacer-driver has generally radially disposed, with respect to the axis of the drive shaft 14, drive surfaces 28. An extension of a shaft pin 29 on the drive shaft 14 selectively engages the drive surfaces 28 one at a time in a manner which will be described below. The engagement of the pin 29 with one of the drive surfaces 28 limits the amount of rotation of the shaft 14 relative to the spacer-driver 27 and provides driving engagement between the shaft and the spacer-driver. Hence, the spacer-driver serves the dual function of spacing the drive-plates 26 and limiting relative rotation of the shaft 14 and the drive assembly 25.

A pivot pin 30 extends from one drive plate 26 to the other and is mounted in the two drive plates. The pivot pin 30 carries a bi-directional drive pawl 31. The drive pawl 31 is pivotal on the pin 30 and symmetrical about a plane which includes the axis of the pin 30 so as to provide driving connection in both directions in a manner which will be set out below.

The drive ring 23 is equipped with three circumferentially equally spaced and inwardly oriented driving notches 33. As the subsequent description of the operation of the device will explain, one notch is sufficient to provide an operative device. However, a plurality of notches, preferably three (3) provides a smoother, quicker acting clutch mechanism than does a single notch.

Figure 3:
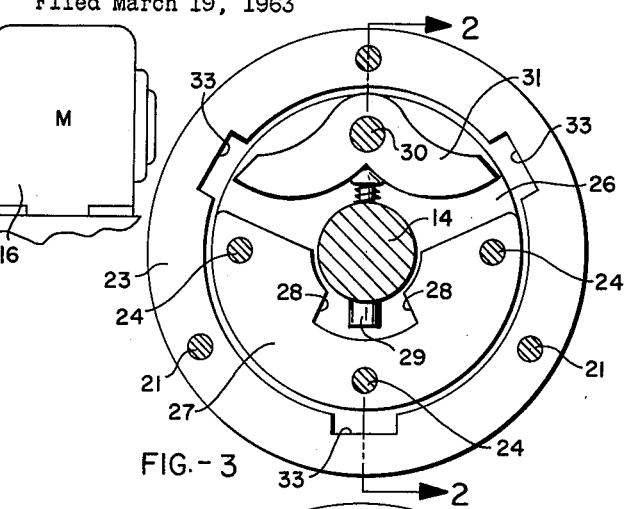
FIGURE 3–5 are sectional views of the clutch as seen from the plane indicated by the line 3—3 of FIGURE 2 and showing the clutch in various positions; and, FIGURE 6 is an enlarged fragmentary view of the spring biased pawl positioning pin.
Figure 6:
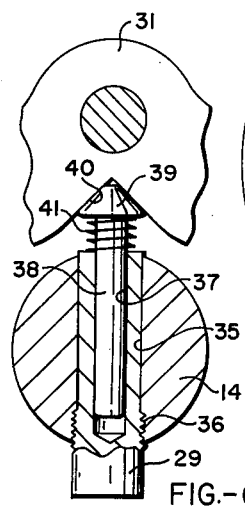

As an examination of FIGURE 6 will show, the shaft pin 29 extends through a bore 35 in the shaft 14. The shaft pin is threaded into the shaft at 36 near the extension which engages the stop surfaces 28 on the spacer-driver 27. At the opposite end of the pin 29, remote from the spacer-driver, an axially disposed bottomed bore 37 is provided. A pawl positioner pin 38 is slidably mounted in this pin bore 37. The pawl positioner 38 has a head 39 which is generally V shaped and adapted to engage a V shaped pawl recess 40 and urge the pawl 31 into a neutral position as shown in FIGURES 3 and 6. A spring 41 surrounds the shaft of the pawl positioner 38 and is interposed between the head 39 and the shaft pin 29. This spring 41 biases the pawl positioner head 39 into engagement with the bi-directional pawl 31.

Figure 4:
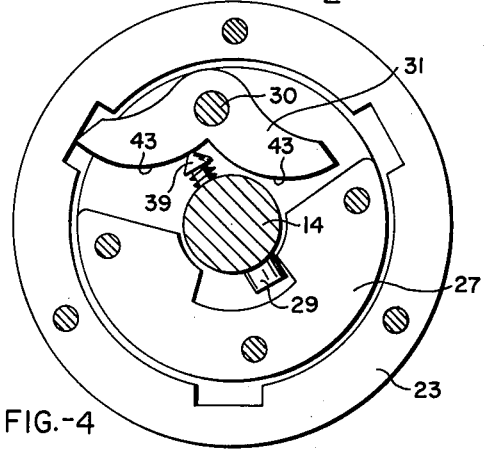
Figure 5:
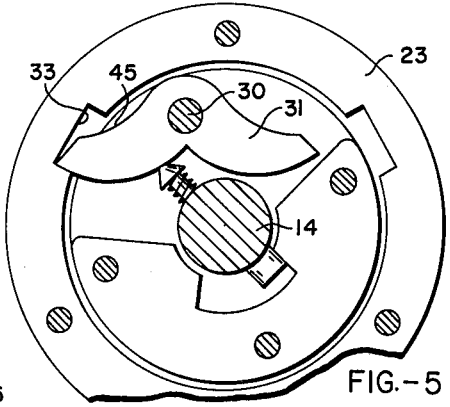

When the shaft 14 commences to rotate relative to the drive ring 23, the pawl positioner causes the pawl to pivot around its pivot pin 30. This is illustrated in FIGURE 4 where counterclockwise rotation of the shaft 14 relative to the drive member 23 is occurring. The head 39 of the positioner rides out along one of the lower or positioning surfaces 43 of the pawl 31. This biases the pawl outwardly until one end is in yieldable engagement with the inner surface of the drive ring 23. Once the shaft pin 29 engages one of the drive surfaces 28, the spacer-driver 27 is caused to rotate with the shaft 14. This causes the pawl 31 to rotate with it as the entire clutch driving assembly 25 is secured and rotates with the spacer-driver. Rotation of the clutch driving assembly 25 will continue until the end of the pawl in engagement with the drive ring 23 is aligned with one of the drive notches 33 and drops into it. Continued rotation of the drive assembly 25 relative to the drive ring 23 will occur until the pawl is in engagement with one end wall, of the engaged notch 33 as shown in FIGURE 5. Once the clutch is in the position shown in FIGURE 5, continued counterclockwise rotation of the shaft 14 will drive the drive ring 23 in a counterclockwise direction.

Should the drive ring 23 commence to rotate faster than the shaft 14, the end wall of the notch 33 which is spaced from the pawl, the engaged end wall will act against a camming surface 45 on the side of the pawl opposite the positioning surface 43. Engagement of the edge of the notch of the now-faster rotating drive ring 23 with the camming surface 45 will pivot the pawl about its pivot pin 30 and against the action of the positioner spring 41 compressing the spring. This compression will continue until the pawl has moved a sufficient amount to permit it to be lifted completely out of the notch 33 and allow the drive ring 23 to rotate freely in a counterclockwise direction at a higher speed than the shaft 14.

When rotation stops, the action of the spring 41 will bias the head 39 of the positioner 38 into a central or neutral position as shown in FIGURE 3. In this position the head is in a notch on the under side of the pawl defined by the intersection of the two camming surfaces 43. This action of the positioner urging the pawl into the neutral position of FIGURES 2 and 3 whenever power is not applied to the shaft produces one of the outstanding advantages of the invention in that it moves the pawl to a neutral position and maintains it there to assure free wheeling at times when it is desired.

It will be apparent that driving engagement for clockwise rotation is simply the reverse of the counterclockwise driving engagement which has been described and shown.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A clutch mechanism comprising:
 (a) a shaft;
 (b) a clutched driving assembly mounted on the shaft and comprising:
  (i) a pair of annular drive plates;
  (ii) a spacer-driver between and fixed to the drive plates;
  (iii) a bi-directional pawl pivotally mounted on the drive plates;
  (iv) a shaft pin mounted in the shaft and projecting from one side thereof;
  (v) said spacer-driver including circumferentially spaced drive surfaces abuttable with the pin;
  (vi) a positioner telescoped into the pin; and,
  (vii) a spring around the positioner and biasing it against the pawl;
 (c) axially spaced face plates on either side of said driving assembly;
 (d) a driven ring fixed to and between face plates;
 (e) said ring having inwardly directed notches;
 (f) said positioner including a head with a tapered surface;
 (g) said pawl having curved head engageable surfaces defining a notch; and,
 (h) the relationship of the positioner head surfaces and the pawl head surfaces being such that the positioner urges the pawl into a driving position when the shaft is rotated and into a neutral position when the shaft is not rotated and the ring overruns.

2. A clutching mechanism comprising:
 (a) a drive member;
 (b) a driven member;
 (c) bi-directional overrunning clutch means interposed between the members and selectively automatically operatively connecting the members in either direction of rotation when the drive member rotates to cause the driven member to be driven by the driving member while permitting overrunning of the driven member;
 (d) said clutch means including a pawl having surfaces defining forward, reverse, and neutral positions; and,
 (e) said clutch means also including biased means between the drive member and the pawl for urging the pawl into selective engagement with said surfaces, said biased means abutting the surfaces defining said neutral position and maintaining the pawl in a neutral free-wheeling position whenever the drive member is not rotating and the driven member has overrun and abutting a selected one of the surfaces defining the forward and reverse positions.

3. In an overrunning clutch having a drive shaft and a pawl, the improvement comprising:
 (a) said shaft having a through transverse bore;
 (b) a pin threaded into one end of the bore and projecting outwardly therefrom to provide a drive projection;
 (c) a pawl positioner having a shank in the bore and a generally conical head abutting the pawl; and,
 (d) a spring around the shank and between the head and the shaft and biasing the head against the pawl.

4. In combination with a prime mover, a clutching mechanism comprising:
 (a) a shaft connected to the prime mover;
 (b) a driven ring around the shaft;
 (c) bi-directional overrunning clutch means interposed between the shaft and ring and selectively, automatically, operatively connecting the two in either direction of rotation when the shaft rotates to cause the ring to be driven by the shaft while permitting overrunning of the ring;

(d) said clutch means including a pawl and biased means between the shaft and the pawl for urging the pawl into engagement with the ring whenever the shaft rotates and for urging the pawl into a neutral position whenever the shaft is not rotated and the ring overruns; and, (e) said biased means including:
  (i) a pin projecting from the shaft for driving connection to the pawl; and,
  (ii) a spring biased positioner carried by the shaft and abutting the pawl.

References Cited by the Examiner
UNITED STATES PATENTS

| | | | |
|---|---|---|---|
| 633,880 | 9/1899 | Miller | 192—43.1 |
| 879,960 | 2/1908 | Hanusch | 192—43 |
| 1,020,417 | 3/1912 | Hartley | 192—43 |
| 1,466,214 | 8/1923 | Thompson | 192—50 |
| 2,188,846 | 1/1940 | Rueb | 192—43.1 |
| 2,762,483 | 9/1956 | Clark | 192—105 |
| 2,772,576 | 12/1956 | Ross | 192—43.1 |

DAVID J. WILLIAMOWSKY, *Primary Examiner.*

DON A. WAITE, *Examiner.*